United States Patent
Kim et al.

(10) Patent No.: US 9,825,325 B2
(45) Date of Patent: Nov. 21, 2017

(54) RECHARGEABLE BATTERY

(71) Applicant: Samsung SDI Co., Ltd., Yongin-si, Gyeonggi-do (KR)

(72) Inventors: Yun-Woong Kim, Yongin-si (KR); Chang-Young Choi, Yongin-si (KR); Soon-Chul Byun, Yongin-si (KR); Young-Chang Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 68 days.

(21) Appl. No.: 14/530,597

(22) Filed: Oct. 31, 2014

(65) Prior Publication Data

US 2015/0140381 A1 May 21, 2015

(30) Foreign Application Priority Data

Nov. 20, 2013 (KR) .................. 10-2013-0141421

(51) Int. Cl.
*H01M 10/04* (2006.01)
*H01M 4/70* (2006.01)
*H01M 4/02* (2006.01)

(52) U.S. Cl.
CPC ......... *H01M 10/0431* (2013.01); *H01M 4/02* (2013.01)

(58) Field of Classification Search
CPC ........................... H01M 4/02; H01M 10/0431
USPC ................................................ 429/94
See application file for complete search history.

(56) References Cited

U.S. PATENT DOCUMENTS

| 7,163,565 B2 | 1/2007 | Yanagawa et al. |
| 8,394,524 B2 | 3/2013 | Kim et al. |
| 2008/0026293 A1* | 1/2008 | Marple .................. H01M 2/22 429/231.95 |
| 2010/0310924 A1* | 12/2010 | Kaneda .................. H01M 4/13 429/163 |
| 2011/0104539 A1* | 5/2011 | Oh ......................... H01M 2/22 429/94 |

FOREIGN PATENT DOCUMENTS

| JP | 2010-80427 A | 4/2010 |
| KR | 2000-0005154 U | 3/2000 |
| KR | 10-2004-0005243 A | 1/2004 |
| KR | 10-2004-0071613 A | 8/2004 |
| KR | 10-2009-0085966 | 8/2009 |

OTHER PUBLICATIONS

KIPO Office Action dated Oct. 12, 2016, for corresponding Korean Patent Application No. 10-2013-0141421 (6 pages).

* cited by examiner

*Primary Examiner* — Osei Amponsah
(74) *Attorney, Agent, or Firm* — Lewis Roca Rothgerber Christie LLP

(57) ABSTRACT

A rechargeable battery with improved safety and increased capacity of a cell including: an electrode assembly including a first electrode, a second electrode, and a separator between the first and second electrodes; a case comprising an opening configured to receive the electrode assembly; a cap assembly coupled to the sides of the opening of the case; and a lead tab connecting the first electrode to the cap assembly, wherein the first electrode includes a coating region where an active material is coated on both surfaces of a current collector, a first uncoated region where the active material is not coated on the current collector, and a second uncoated region where the active material is not coated on one surface of the current collector.

8 Claims, 5 Drawing Sheets

RECHARGEABLE BATTERY

CROSS-REFERENCE TO RELATED APPLICATION

This application claims priority to and the benefit of Korean Patent Application No. 10-2013-0141421 filed in the Korean Intellectual Property Office on Nov. 20, 2013, the entire content of which is incorporated herein by reference.

BACKGROUND

1. Field

The described technology relates generally to a rechargeable battery capable of maximizing an amount of an active material coated on a positive current collector.

2. Description of the Related Art

As technical developments and demand for mobile devices have increased, demand for rechargeable batteries as an energy source has also increased. For example, a cylindrical rechargeable battery includes an electrode assembly formed by spirally winding a separator and electrodes disposed on both sides of the separator together in a shape of a jelly roll, a center pin disposed in a hollow portion in the center of the electrode assembly, a case containing the electrode assembly therein, and a cap assembly closing and sealing an open side of the case.

In the electrode assembly, the electrode includes a coated region (a composite region) formed by coating an active material (a composite slurry) on a current collector and an uncoated region exposing the current collector at the end of the coated region. The uncoated region is usually positioned at both ends of the electrode assembly, is connected to the case through the negative current collecting plate, and is connected to the cap assembly through the positive current collecting plate and the lead tab.

In the cylindrical rechargeable battery having a limited volume, a positive active material often determines the cell capacity. Accordingly, to obtain a high-capacity cell, it is required that the positive active material is maximally increased. In the example of the positive electrode described above, the uncoated region where the active material is not coated on either surface of the current collector, is located at both ends of the current collector. However, only one uncoated region is connected to the lead tab, while the other uncoated region does not contribute to the cell capacity and simply occupies an inner space of the cell. In other words, the extra uncoated region decreases the capacity in the rechargeable battery of the limited volume.

To compensate for the capacity reduction, a positive electrode, where the uncoated region is not provided at both ends of the current collector, is applied. The positive electrode in this case is formed by the current collector and the coated region during the spiral-winding process of the electrode assembly. As a result, the positive electrode includes the uncoated region at the center of the electrode assembly, and the lead tab is welded to the uncoated region.

However, since the additional uncoated region is removed from the front end of the electrode assembly, the front end becomes deformed due to the thickness of the coated region and starts to push the separator. Accordingly, a short circuit may be generated in the electrode assembly.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed to a rechargeable battery with improved safety and increased capacity of a cell due to maximizing an amount of an active material coated on a current collector.

A rechargeable battery according to one embodiment includes: an electrode assembly comprising a first electrode, a second electrode, and a separator between the first electrode and the second electrode, wherein the separator, the first electrode, and the second electrode are spiral-wound; a case comprising an opening configured to receive the electrode assembly; a cap assembly coupled to the sides of the opening of the case; and a lead tab connecting the first electrode to the cap assembly, wherein the first electrode includes a coating region where an active material is coated on both surfaces of a current collector, a first uncoated region where the active material is not coated on the current collector, the first uncoated region positioned between a first end and a second end of the current collector and connected to the lead tab, and a second uncoated region where the active material is not coated on one surface of the current collector, the second uncoated region positioned at the first end of the current collector, and wherein when the electrode assembly is spiral-wound, the first end of the current collector is in the center of the electrode assembly and the second end of the current collector is at an outermost surface of the electrode assembly.

The first uncoated region and the second uncoated region may be coated with a lamination tape.

The first electrode may further include a third uncoated region where the active material is not coated on one surface of the current collector, the third uncoated region positioned at the second end of the current collector.

The third uncoated region may be coated with the lamination tape.

A first length between the second uncoated region and the first uncoated region may be less than a second length between the first uncoated region and the third uncoated region.

The first length may be from about ⅓ to about ½ of an entire length of the current collector that is spiral-wound, and the second length may be from about ½ to about ⅔ of the entire length of the current collector.

The length of the first uncoated region may be equal to a sum of the length of the second uncoated region and the length of the third uncoated region.

The length of the second uncoated region and the length of the third uncoated region may be in a ratio of 7:3.

The coating region of the first electrode may include an inner coating region on an inner surface of the current collector and adjacent to the second uncoated region at the first end of the current collector, and an outer coating region on an outer surface of the current collector, the outer coating region protruding further than the coating region of the second electrode.

The coating region of the second electrode may include an alignment portion corresponding to a distance between a start pointing of the coating region of the second electrode and a starting point of the inner coating region of the first electrode.

The outer coating region of the first electrode may include an additional alignment portion corresponding to a distance between a starting point of the first electrode and a starting point of the inner coating region of the first electrode, wherein the additional alignment portion entirely overlaps the alignment portion.

As described above, according to an exemplary embodiment, the coating region of the active material is cut to provide the first uncoated region and the second uncoated region on the first electrode, such that the amount of the coated active material may be maximized in the current collector, thereby increasing the capacity of the cell.

In addition, the stress due to thickness difference is reduced by buffering the thickness difference of the first end of the first electrode positioned in the center of the spiral-wound electrode assembly, such that the deformation of the first end and the second electrode facing thereto, as well as the pressure exerted by the separator on the first end of the first electrode, may be reduced or prevented. That is, a short circuit may be substantially prevented in the electrode assembly, thereby improving safety of the cell.

DETAILED DESCRIPTION

Figure 1:
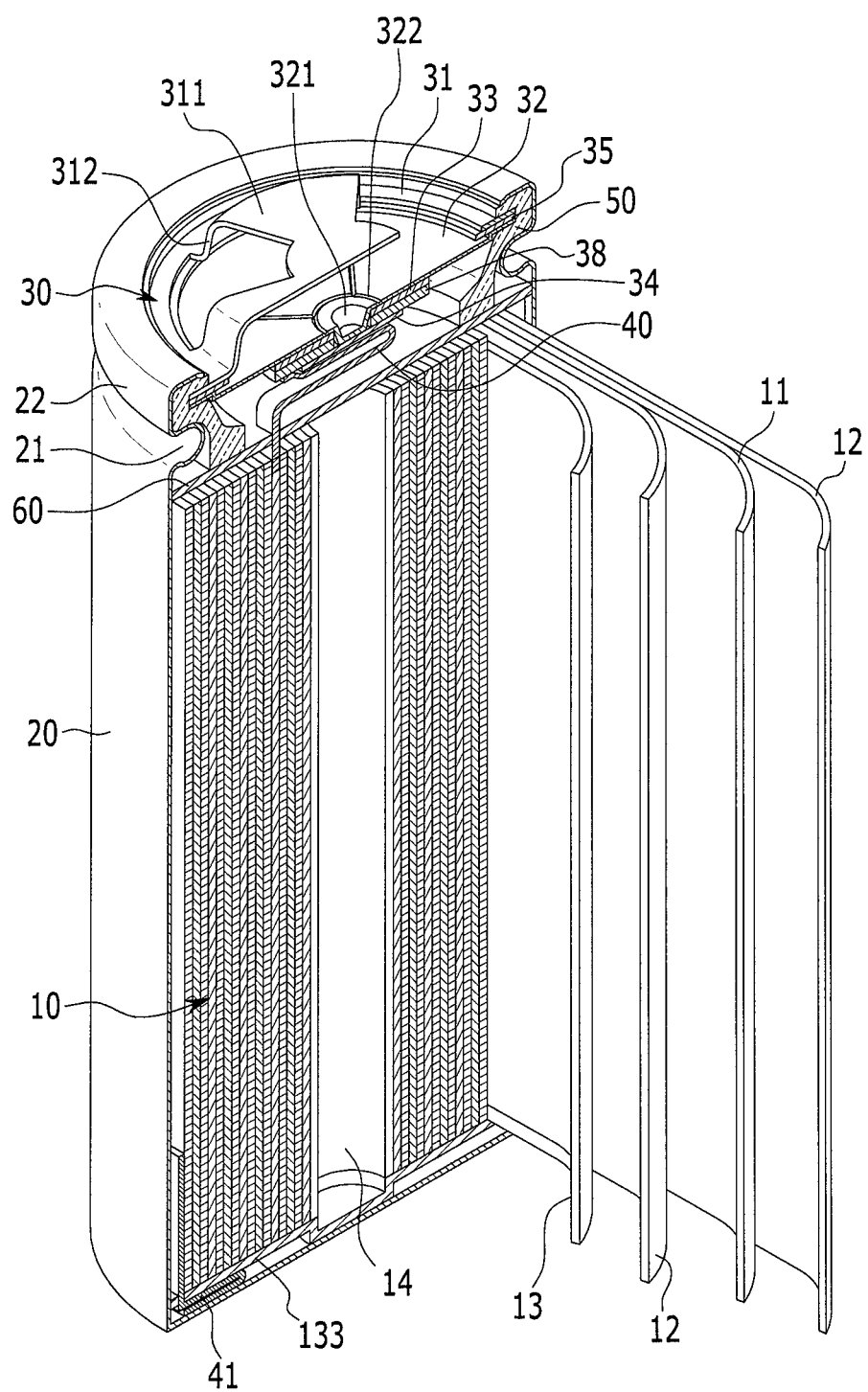
FIG. 1 is a cross-sectional view of a rechargeable battery of a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In the drawings, the thickness or size of elements are exaggerated for clarity and not necessarily drawn to scale. Further, the use of "may" when describing embodiments of the present invention refers to "one or more embodiments of the present invention."

FIG. 1 is a cross-sectional view of a rechargeable battery of a first exemplary embodiment. Referring to FIG. 1, a rechargeable battery includes an electrode assembly 10 performing charging and discharging, a case 20 containing the electrode assembly 10 therein, a cap assembly 30 coupled to the sides of an opening of the case 20, and a lead tab 40 (for example, a positive lead tab) electrically connecting the cap assembly 30 to the electrode assembly 10.

In some embodiments, the cap assembly 30 is coupled to the sides of the opening of the case 20 by interposing a gasket 50 that insulates the cap assembly 30 from the case 20, and closes and seals the case 20 after the electrode assembly 10 and an electrolyte solution have been placed in the case 20.

In some embodiments, the cap assembly 30 is electrically connected to the electrode assembly 10 through a current interrupt device and the positive lead tab 40. A positive insulating plate 60 is interposed between the cap assembly 30 and the electrode assembly 10 to insulate them, and the positive insulating plate 60 is penetrated by the positive lead tab 40.

The electrode assembly 10 includes a first electrode 11 (for example, a positive electrode), a separator 12, and a second electrode 13 (for example, a negative electrode) that are sequentially stacked. The electrode assembly 10 is formed by spiral-winding the positive electrode 11, the negative electrode 13, and the insulating separator 12 between the positive and negative electrodes, in a jelly roll shape.

In one embodiment, the electrode assembly 10 may be formed to be cylindrical. The cylindrical electrode assembly 10 includes a center pin 14 at the center thereof. The center pin 14 holds the electrode assembly 10 in a cylindrical shape.

Figure 2:
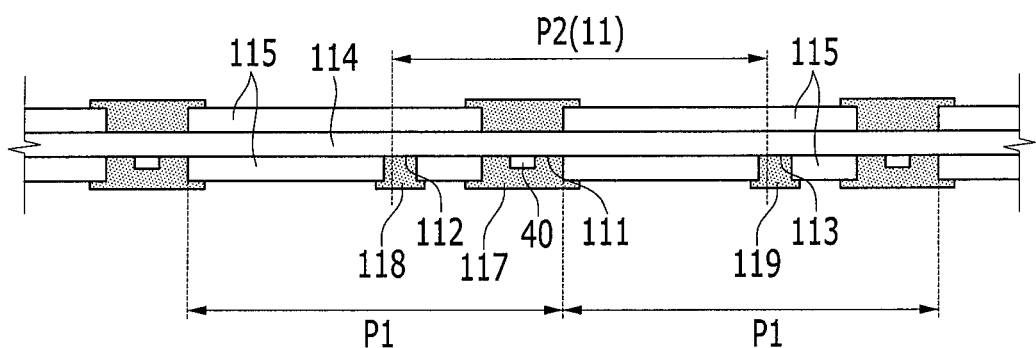
FIG. 2 is schematic a cross-sectional view of a first electrode before cutting.
Figure 3:
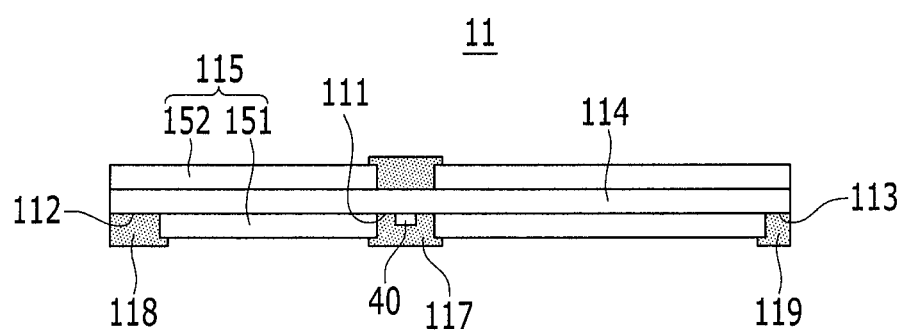
FIG. 3 is a schematic cross-sectional view of a cut first electrode of FIG. 2.

FIG. 2 is a cross-sectional view of a first electrode before cutting, and FIG. 3 is a cross-sectional view of a cut first electrode of FIG. 2. Referring to FIG. 2 and FIG. 3, the positive electrode 11 includes a coating region 115, where an active material is coated on both sides of a current collector 114 formed of a thin metal plate, and a first uncoated region 111, a second uncoated region 112, and a third uncoated region 113, where in each uncoated region the active material is not coated and the current collector 114 is exposed. In some embodiments, the current collector of the positive electrode 11 may be formed of aluminum.

In some embodiments, the first uncoated region 111 is formed at one side of the coating region 115 between a first and a second end of the current collector 114, such that when the electrode assembly 10 is completely spiral-wound, the first end is positioned in the center of the electrode assembly 10 and the second end is positioned at an outermost surface of the electrode assembly 10. The positive lead tab 40 is connected to the first uncoated region 111.

In the present exemplary embodiment, the first uncoated region 111 is formed symmetrically at both surfaces of the current collector 114 to prevent a spiral-winding defect. The positive lead tab 40 may be welded to the first uncoated region 111 at one surface of the current collector 114. However, the first uncoated region may also be formed at only one surface of the current collector.

The second uncoated region 112 is formed at one side of the coating region 115 on one surface of the current collector 114 at the first end of the current collector 114. The third uncoated region 113 is formed at one side of the coating region 115 on one surface of the current collector 114 at the second end of the current collector 114. In the present embodiments, when the electrode assembly 10 is completely spiral-wound, the first end is positioned at the center of the electrode assembly 10, and the second end is positioned at the outermost surface of the electrode assembly 10.

Referring to FIG. 2 and FIG. 3, a manufacturing process of the positive electrode 11 will be described. The active material is coated on both surfaces of the current collector 114 with a predetermined coating pattern P1 to form the coating region 115, and is cut according to a unit cell pattern P2 to obtain the positive electrode 11 for forming one electrode assembly 10. At this time, the second and third uncoated regions 112 and 113 and the coating region 115 are also cut.

As illustrated in FIG. 3, when the positive electrode 11 is cut, each unit cell pattern P2 includes the coating region 115, the first uncoated region 111 between the lateral ends of the pattern, and the second and third uncoated regions 112 and 113 at respective lateral ends of the pattern. Referring back to FIG. 2, the coating pattern P1 is arranged to overlap portions of two adjacent unit cell patterns P2, such that each coating pattern P1 includes the first uncoated region 111, the second uncoated region 112 and a portion of the coating region 115 of the first unit cell pattern P2, and the third uncoated region 113 and a portion of the coating region 115 of an adjacent unit cell pattern P2.

In the embodiment where the first uncoated region 111 is connected to the positive lead tab 40, the surface of the first uncoated region 111 to which the positive lead tab 40 is not connected is coated with lamination tape 117. Also, the neighboring second and third uncoated regions 112 and 113 are respectively coated with lamination tapes 118 and 119.

In some embodiments, the lamination tape 117 prevents the active material adjacent to the sides of the first uncoated region 111 from separating and exposing the first uncoated region 111. The lamination tape 117 may also smooth out a thickness difference between the coating region 115 and the first uncoated region 111 on both surfaces of the current collector 114.

The lamination tapes 118 and 119 are respectively placed at both sides of the second and third uncoated regions 112 and 113 when cutting the unit cell pattern P2, thereby preventing the active material adjacent to the second and third uncoated regions 112 and 113 from separating and exposing the second and third uncoated regions 112 and 113. The lamination tapes 118 and 119 are divided into a first end side and a second end side with respect to the electrode assembly 10. The divided lamination tapes 118 and 119 may smooth out the thickness difference between the coating region 115 and the second and third uncoated regions 112 and 113 at one surface of the current collector 114.

Again referring to FIG. 1 and FIG. 4, in some embodiments the negative electrode 13 includes a coating region 131, where the active material is coated to both sides of a current collector 130 formed of the thin metal plate, and an uncoated region 132, where the active material is not coated and the current collector 130 is exposed. In some embodiments, the current collector 130 of the negative electrode 13 may be formed of copper.

For the spirally-wound electrode assembly 10, the positive lead tab 40 is connected to the first uncoated region 111 of the positive current collector 114 of the positive electrode 11 by welding, and penetrates the positive insulating plate 60 to be electrically connected to the cap assembly 30. The cap assembly 30 acts as the positive terminal in the rechargeable battery of the present embodiments.

Referring to the negative electrode 13, a negative insulating plate 133 is positioned between the electrode assembly 10 and the case 20 to electrically insulate them. A negative lead tab 41 is connected to the uncoated region 132 of the negative electrode 13 by welding. The uncoated region 132 is positioned either at the outermost area or at the center of the electrode assembly 10. In some embodiments, the negative lead tab 41 penetrates the negative insulating plate 133 to be connected to the case 20 by welding, and accordingly, the case 20 acts as the negative terminal of the rechargeable battery of the present embodiments. The negative lead tab 41 may be formed of a conductive metal such as aluminum, an aluminum alloy, or nickel coated steel.

The case 20 has an opening at one side to allow the electrode assembly 10 having a cylindrical shape to be inserted therein.

In some embodiments, the cap assembly 30 includes a cap plate 31, a positive temperature coefficient (PTC) element 35, a vent plate 32, an insulating member 33, a sub-plate 34, and a middle plate 38 that are sequentially stacked starting from the outer side towards the inner side of the case 20.

In some embodiments, the cap plate 31 is connected to the positive lead tab 40 thereby acting as the positive terminal in the rechargeable battery of the present embodiments. The cap plate 31 also includes a protruding portion 311 protruding outside of the case 20 and an exhaust port 312 that forms an opening at the side of the protruding portion 311 that exhausts inner gas.

In some embodiments, the current interruption device includes the vent plate 32 and the sub-plate 34 connected to each other in the cap assembly 30. The vent plate 32 and the sub-plate 34 may be connected by welding.

The vent plate 32 formed at one side of the current interruption device and is installed at the inner side of the cap plate 31, thereby being electrically connected to the sub-plate 34 formed at the other side of the current interruption device.

In some embodiments, the vent plate 32 includes a vent 321, and the vent 321 is configured to rupture at a high pressure condition to interrupt the electrical connection with the sub-plate 34 and discharge the inner gas.

In some embodiments, the vent 321 protrudes from the vent plate 32 toward the inside of the case 20. The vent plate 32 may further include a notch 322 for guiding the rupture of the vent 321 near the vent 321.

When the internal pressure of the battery is increased by the gas generated in the case 20, the notch 322 is initially damaged to discharge the gas through the vent plate 32 and the exhaust port 312, such that the possibility of explosion of the rechargeable battery may be reduced or prevented.

In the embodiments where the connection of the vent plate 32 and the sub-plate 34 is interrupted by the rupture of the vent 321, the electrode assembly 10 and the cap plate 31 are electrically disconnected.

In some embodiments, the positive temperature coefficient element 35 is installed between the cap plate 31 and the vent plate 32, and therefore the current flowing between the cap plate 31 and the vent plate 32 may be controlled according to the temperature inside the rechargeable battery.

When the inner temperature of the battery reaches a high temperature condition, the electrical resistance of the positive temperature coefficient element 35 is increased and approaches infinity. As such, the positive temperature coefficient element 35 may interrupt the flow of the charging or discharging current between the cap plate 31 and the vent plate 32.

In some embodiments, the sub-plate 34 faces the vent plate 32, such that both the sub-plate 34 and the vent plate 32 face the insulating member 33 positioned between them, and the sub-plate 34 is electrically connected to the vent 321. In some embodiments, the middle plate 38 is placed between the insulating member 33 and the sub-plate 34. The vent 321 protrudes through the penetration holes of the insulating member 33 and the middle plate 38, and is connected to the sub-plate 34.

Accordingly, the middle plate 38 is electrically connected to the sub-plate 34 and the vent 321. Also, the middle plate 38 is connected to the positive lead tab 40 by welding, and the positive lead tab 40 is connected to the first uncoated region 111 of the positive electrode 11 by welding.

As a result, the positive electrode lead tab 40 is electrically connected to the cap plate 31 by sequentially passing through the middle plate 38, the sub-plate 34, the vent 321, the vent plate 32, and the positive temperature coefficient element 35.

In some embodiments, the positive insulating plate 60 is disposed between the sub-plate 34 and the electrode assembly 10 to electrically insulate the electrode assembly 10 from the sub-plate 34 and the middle plate 38. The positive lead tab 40 is connected to the first uncoated region 111 of the positive electrode 11 and is connected to the middle plate 38 through the positive insulating plate 60.

In some embodiments, the cap assembly 30 is inserted into the opening of the case 20, while providing the gasket 50 to be placed between the cap assembly 30 and the case 20, and is fixed to the sides of the opening of the case 20 through a crimping process to thus form the rechargeable battery cell.

In the present embodiment, the case 20 includes a beading portion 21, and the gasket 50 is inserted on the side of the opening of the case 20 at opposite ends of the opening. The beading portion 21 and the gasket 50 form a clamping portion 22 for holding an external circumference of the cap assembly 30.

Figure 4:
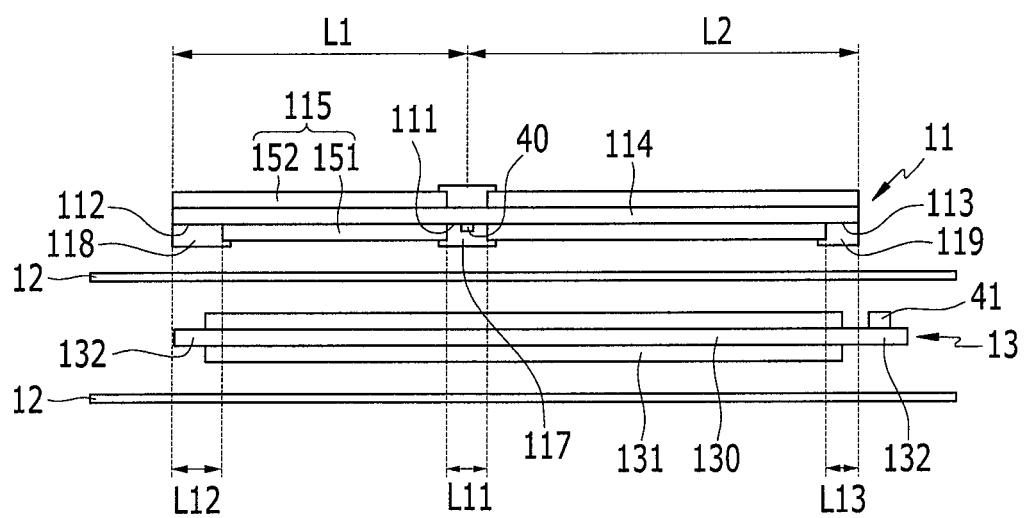
FIG. 4 is a schematic cross-sectional view of the first electrode of FIG. 3, a separator, and a second electrode before spiral-winding.

FIG. 4 is a cross-sectional view of a first electrode of FIG. 3, a separator, and a second electrode before spiral-winding. Referring to FIG. 4, in the positive electrode 11, the first uncoated region 111, the second uncoated region 112, and the third uncoated region 113 are respectively coated by the lamination tapes 117, 118, and 119.

A first length L1 between the second uncoated region 112 and the first uncoated region 111 is less than a second length L2 between the first uncoated region 111 and the third uncoated region 113. For example, the first length L1 may be from about ⅓ to about ½ of the entire length of the current collector 114, and the second length L2 may be from about ½ to about ⅔ of the entire length of the current collector 114.

Accordingly, in the embodiments where the electrode assembly 10 is spiral-wound, the positive lead tab 40 is positioned toward the center of the electrode assembly 10. The positive lead tab 40 has a function of moving electrons in the charge and discharge process and is positioned at the center such that the cell resistance may be reduced.

In some embodiments, a length L11 of the first uncoated region 111 is the same as a sum of a length L12 of the second uncoated region 112 and a length L13 of the third uncoated region 113. Accordingly, the same size of lamination tape can be used in forming lamination tapes 117, 118, and 119.

In some embodiments, the second uncoated region 112 and/or the third uncoated region 113 is respectively cut at the first and second ends of the current collector 114, thereby being divided into the length L12 and the length L13, respectively. The length L12 of the second uncoated region 112 at the first end of the current collector 114 and the length L13 of the third uncoated region 113 at the second end of the current collector 114 may be in a ratio of 7:3. When the electrode assembly 10 is completely spiral-wound, the first end is positioned at the center of the electrode assembly 10 and the second end is positioned at the outermost surface of the electrode assembly 10.

In some embodiments, the coating region 115 of the positive electrode 11 includes an inner coating region 151 coated on an inner surface of the current collector 114 and positioned between the first and second uncoated regions 111 and 112, and an outer coating region 152 coated on an outer surface of the current collector 114. When compared to the coating region 131 of the negative electrode 13, the outer coating region 152 extends further than the coating region 131 of the negative electrode 13.

At the first end of the current collector, the second uncoated region 112 where the inner coating region 151 is not formed, buffers the thickness difference of the coating region 115 corresponding to the difference in lengths between the inner coating region 151 and the outer coating region 152. Therefore, when performing the spiral-winding, the stress acting on the outer coating region 152 by the thickness difference of the coating region 115 is reduced, and a deformation of the first end of the current collector 114 of the positive electrode 11, and the coating region 131 and the uncoated region 132 of the negative electrode 13 facing thereto, may be reduced or prevented.

Figure 5:
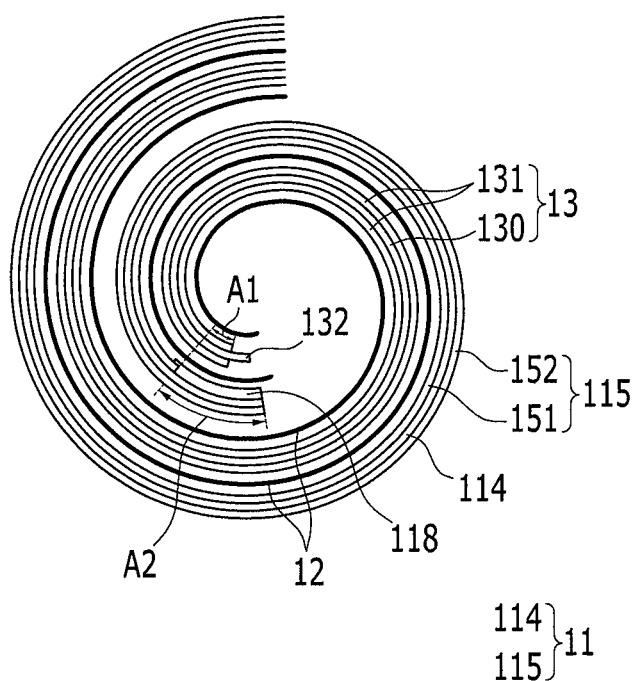
FIG. 5 is a cross-sectional view of the first electrode, the separator, and the second electrode of FIG. 4 at the start state of the spiral-winding process.

Referring to FIG. 5, in some embodiments, the end of the second uncoated region adjacent to the inner coating region 151 is coated by the lamination tape 118, such that the stress acting on the outer coating region 152 is absorbed under the spiral-winding to be further reduced, and the deformation of the first end of the current collector 114 of the positive electrode 11 and the coating region 131 and the uncoated region 132 of the negative electrode 13 facing thereto may be further reduced or prevented.

At the second end of the current collector 114, the third uncoated region 113, where the inner coating region 151 is not formed, buffers the thickness difference of the coating region 115 corresponding to the difference in lengths between the inner coating region 151 and the outer coating region 152. Therefore, when performing spiral-winding, the stress acting on the coating region 131 and the uncoated region 132 of the negative electrode 13 due to the thickness difference of the coating region 115 is reduced, and the deformation of the second end of the current collector 114 of the positive electrode 11, and the coating region 131 and the uncoated region 132 of the negative electrode 13, located at the outermost area of the electrode assembly, 10, may be reduced or prevented.

FIG. 5 is a cross-sectional view of a first electrode, a separator, and a second electrode of FIG. 4 an initial state of spiral-winding. Referring to FIG. 5, the coating region 131 of the negative electrode 13, includes an alignment portion A1 between a starting point of the coating region 131 and a starting point of the inner coating region 151.

In some embodiments, the outer coating region 152 of the positive electrode 11 protrudes further than the coating region 131 of the negative electrode 13, so that the end of the coating region 131 of the negative electrode 13 corresponds to the middle of the outer coating region 152 of the positive electrode 11.

In some embodiments, the outer coating region 152 of the positive electrode 11 includes an additional alignment portion A2 corresponding to the alignment portion A1. The additional alignment portion A2 of the positive electrode 11 is set from the starting point of the positive electrode 11 to the end of the alignment portion A1 of the negative electrode 13, and therefore overlaps with the entire alignment portion A1 of the negative electrode 13. The additional alignment portion A2 and the positive electrode 11 may operate the charge and discharge that interacts with the alignment portion A1 of the negative electrode 13. Accordingly, cell capacity may be improved.

In some embodiments, in the center of the electrode assembly 10, the lamination tape 118 coats the end of the second uncoated region 112 and the inner coating region 151, thereby absorbing the stress acting on the outer coating region 152.

Next, a second exemplary embodiment will be described, and the description of the same constitutions as in the first exemplary embodiment is not provided here again, and only the differences will be described.

Figure 6:
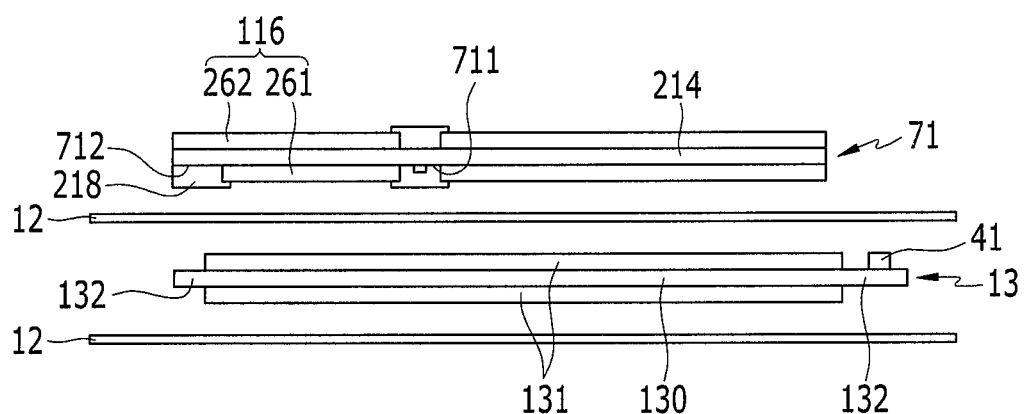
FIG. 6 is a cross-sectional view of a first electrode, a separator, and a second electrode before spiral-winding in a rechargeable battery according to a second exemplary embodiment.

FIG. 6 is a cross-sectional view of a first electrode, a separator, and a second electrode before spiral-winding in a rechargeable battery according to the second exemplary embodiment. Referring to FIG. 6, in the second exemplary embodiment, a positive electrode 71 includes a first uncoated region 711 and a second uncoated region 712 and does not include the third uncoated region 113 of the first exemplary embodiment.

A coating region 116 of the positive electrode 71 includes an inner coating region 261 coated on the inner surface of a current collector 214 at the first end of the current collector 214, between the first uncoated region 711 and the second uncoated region 712, and an outer coating region 262 coated on the outer surface of the current collector 214. When comparing the positive electrode 71 and the negative electrode 13, the outer coating region 262 protrudes further than the coating region 131 of the negative electrode 13.

The second uncoated region 712 buffers the thickness difference of the coating region 116 corresponding to the difference in lengths between the inner coating region 261 and the outer coating region 262. Therefore, when performing spiral-winding, the stress acting on the outer coating region 262 is reduced, and the deformation of the first end of the current collector 214 of the positive electrode 71, and the coating region 131 and the uncoated region 132 of the negative electrode 13, located at the center of the electrode assembly, may be reduced or prevented.

In some embodiments, the end of the second uncoated region 712 adjacent to the inner coating region 261 is coated by a lamination tape 218, such that the separation of the active material adjacent to the second uncoated region 712 during the spiral-winding process is reduced or prevented, the stress acting on the outer coating region 262 is absorbed and reduced, and the deformation of the first end of the current collector 214 of the positive electrode 71, and the coating region 131 and the uncoated region 132 of the negative electrode 13 may be further reduced or prevented.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

| | |
|---|---|
| 10: electrode assembly | 11, 71: first electrode (positive electrode) |
| 12: separator | 13: second electrode (negative electrode) |
| 14: center pin | 20: case |
| 21: beading portion | 22: clamping portion |
| 30: cap assembly | 31: cap plate |
| 32: vent plate | 33: insulating member |
| 34: sub-plate | |
| 35: positive temperature coefficient (PTC) element | |
| 38: middle plate | 40, 41: positive, negative lead tab |
| 50: gasket | 60, 133: positive and negative insulating plate |
| 111, 711: first uncoated region | 112, 712: second uncoated region |

-continued

Description of Symbols

| | |
|---|---|
| 113: third uncoated region | 114, 214, 130: current collector |
| 115, 131, 116: coating region | 117, 118, 119, 218: lamination tape |
| 132: uncoated region | 151, 261: inner coating region |
| 152, 262: outer coating region | 311: protrusion portion |
| 312: exhaust port | 321: vent |
| A1: alignment portion | A2: additional alignment portion |
| L1, L2: first, second length | L11: length of a first uncoated region |
| L12: length of a second uncoated region | |
| L13: length of a third uncoated region | |
| P1: coating pattern | P2: unit cell pattern |

What is claimed is:

1. A rechargeable battery comprising:
   an electrode assembly comprising a first electrode, a second electrode, and a separator between the first electrode and the second electrode, wherein the separator, the first electrode, and the second electrode are spiral-wound;
   a case comprising an opening configured to receive the electrode assembly;
   a cap assembly coupled to the sides of the opening of the case; and
   a lead tab connecting the first electrode to the cap assembly,
   wherein the first electrode comprises:
      a coating region where an active material is coated on both surfaces of a current collector,
      a first uncoated region where the active material is not coated on the current collector, the first uncoated region positioned between a first end and a second end of the current collector and connected to the lead tab,
      a second uncoated region where the active material is coated on a first surface of the current collector and is not coated on a second surface of the current collector opposite the first surface, the second uncoated region positioned at the first end of the current collector; wherein when the electrode assembly is spiral-wound, the first end of the current collector is in the center of the electrode assembly and the second end of the current collector is at the outermost surface of the electrode assembly,
      a third uncoated region where the active material is coated on the first surface of the current collector and is not coated on the second surface of the current collector opposite the first surface, the third uncoated region positioned at the second end of the current collector,
      a first lamination tape covering the first uncoated region and an edge portion of a top surface of the coating region adjacent to the first uncoated region,
      a second lamination tape covering the second uncoated region and an edge portion of a top surface of the coating region adjacent to the second uncoated region, and
      a third lamination tape covering the third uncoated region and an edge portion of a top surface of the coating region adjacent to the third uncoated region.

2. The rechargeable battery of claim 1, wherein a first length between the second uncoated region and the first uncoated region is less than a second length between the first uncoated region and the third uncoated region.

3. The rechargeable battery of claim 2, wherein
the first length is from about ⅓ to about ½ of an entire length of the current collector, and
the second length is from about ½ to about ⅔ of the entire length of the current collector.

4. The rechargeable battery of claim 1, wherein the length of the first uncoated region is equal to a sum of the length of the second uncoated region and the length of the third uncoated region.

5. The rechargeable battery of claim 4, wherein
the length of the second uncoated region and the length of the third uncoated region are in a ratio of 7:3.

6. The rechargeable battery of claim 1, wherein
the coating region of the first electrode comprises:
an inner coating region on an inner surface of the current collector and adjacent to the second uncoated region at the first end of the current collector; and
an outer coating region on an outer surface of the current collector, the outer coating region protruding further than a coating region of the second electrode.

7. The rechargeable battery of claim 6, wherein
the coating region of the second electrode comprises an alignment portion corresponding to a distance between a starting point of the coating region of the second electrode and a starting point of the inner coating region of the first electrode.

8. The rechargeable battery of claim 7, wherein
the outer coating region of the first electrode comprises an additional alignment portion corresponding to a distance between a starting point of the first electrode and a starting point of the inner coating region of the first electrode, the additional alignment portion entirely overlapping the alignment portion.

\* \* \* \* \*